(12) United States Patent
Brown (10) Patent No.: US 8,049,173 B1
(45) Date of Patent: Nov. 1, 2011

(54) DUAL USE RF DIRECTED ENERGY WEAPON AND IMAGER

(75) Inventor: Kenneth W. Brown, Yucaipa, CA (US)

(73) Assignee: Raytheon Company, Waltham, MA (US)

( * ) Notice: Subject to any disclaimer, the term of this patent is extended or adjusted under 35 U.S.C. 154(b) by 1202 days.

(21) Appl. No.: 11/750,292

(22) Filed: May 17, 2007

(51) Int. Cl.
*G01J 5/02* (2006.01)
(52) U.S. Cl. .................................................. 250/341.7
(58) Field of Classification Search .............. 250/341.1, 250/341.6, 341.7, 393, 370.09; 89/1.11; 342/13, 22
See application file for complete search history.

(56) References Cited

U.S. PATENT DOCUMENTS

| | | | |
|---|---|---|---|
| 5,089,828 A | 2/1992 | Moss | |
| 5,214,438 A | 5/1993 | Brusgard | |
| 5,612,503 A * | 3/1997 | Sepp | 89/1.11 |
| 6,204,762 B1 | 3/2001 | Dering | |
| 6,487,950 B2 * | 12/2002 | Samland | 89/1.13 |
| 6,799,499 B2 * | 10/2004 | Seregelyi et al. | 89/1.13 |
| 6,967,612 B1 | 11/2005 | Gorman | |
| 7,126,477 B2 | 10/2006 | Gallivan | |
| 7,490,538 B2 * | 2/2009 | Lowell et al. | 89/1.11 |
| 7,784,390 B1 * | 8/2010 | Lowell et al. | 89/1.11 |
| 2007/0040725 A1 | 2/2007 | Lowell | |
| 2007/0076774 A1 | 4/2007 | Brown | |
| 2008/0304549 A1 * | 12/2008 | Calico et al. | 375/131 |
| 2009/0146907 A1 | 6/2009 | Brown | |
| 2010/0117885 A1 * | 5/2010 | Holbrook et al. | 342/22 |

FOREIGN PATENT DOCUMENTS
WO    WO 2007022339    2/2007

OTHER PUBLICATIONS

Riu et al., "A thermal model for human thresholds of microwave-evoked warmth sensation," 1996.
Blick et al., "Thresholds of microwave-evoked warmth sensation in human skin," 1997.
Walters et al., "Effects of blood flow on skin heating induced by millimeter wave irradiation in humans," 2004.
Walters et al., "Heating and pain sensation produced in human skin by millimeter waves: comparison to a simple thermal model," 2000.
U.S. Appl. No. 11/300,876, filed Dec. 15, 2005, Brown.
Delisio & York, "Quasi optical and spatial power combining," IEEE Trans. Microwave Theory and Techniques, v. 50, No. 3, Mar. 2002.
Raytheon Company, Silent Guardian Protection System Datasheet, Jun. 2006.
Wikipedia, "Active Denial System", http://en.wikipedia.org/wiki/Active_Denial_System.
Malibu Research, "Technology—Introduction to FLAPS", http://www.maliburesearch.com/technology.htm.
Kelkar, FLAPS: Conformal phased reflecting surfaces, Mar. 1991, pp. 1-6.
European Patent Office, European Search Report for European Application No. 08836387.4, Mail Date Apr. 28, 2011, pp. 1-9.

* cited by examiner

*Primary Examiner* — David Porta
*Assistant Examiner* — Marcus Taningco
(74) *Attorney, Agent, or Firm* — SoCal IP Law Group LLP; John E. Gunther; Steven C. Sereboff (57) ABSTRACT

There is disclosed an dual use RF directed energy weapon and imager. A generator may provide a first beam of RF electromagnetic energy which may be directed to an object by a beam director. An imager may form an image of the object. The imager may share an aperture defined by the beam director.

31 Claims, 7 Drawing Sheets

DUAL USE RF DIRECTED ENERGY WEAPON AND IMAGER

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to non-lethal weapon systems and to non-lethal weapons systems utilizing directed microwave energy in particular.

2. Description of the Related Art

Non-lethal weapons employing directed microwave energy are a known method to deter or discourage an intruder or other target individual from entering a controlled area or from continuing some undesired action. Example microwave directed energy weapons, also termed "active denial" systems, are described in U.S. Pat. No. 7,126,477 B2 and US 2007/0040725 A1.

DETAILED DESCRIPTION

Throughout this description, the embodiments and examples shown should be considered as exemplars, rather than limitations on the apparatus and methods disclosed or claimed.

Description of Apparatus

Figure 1:
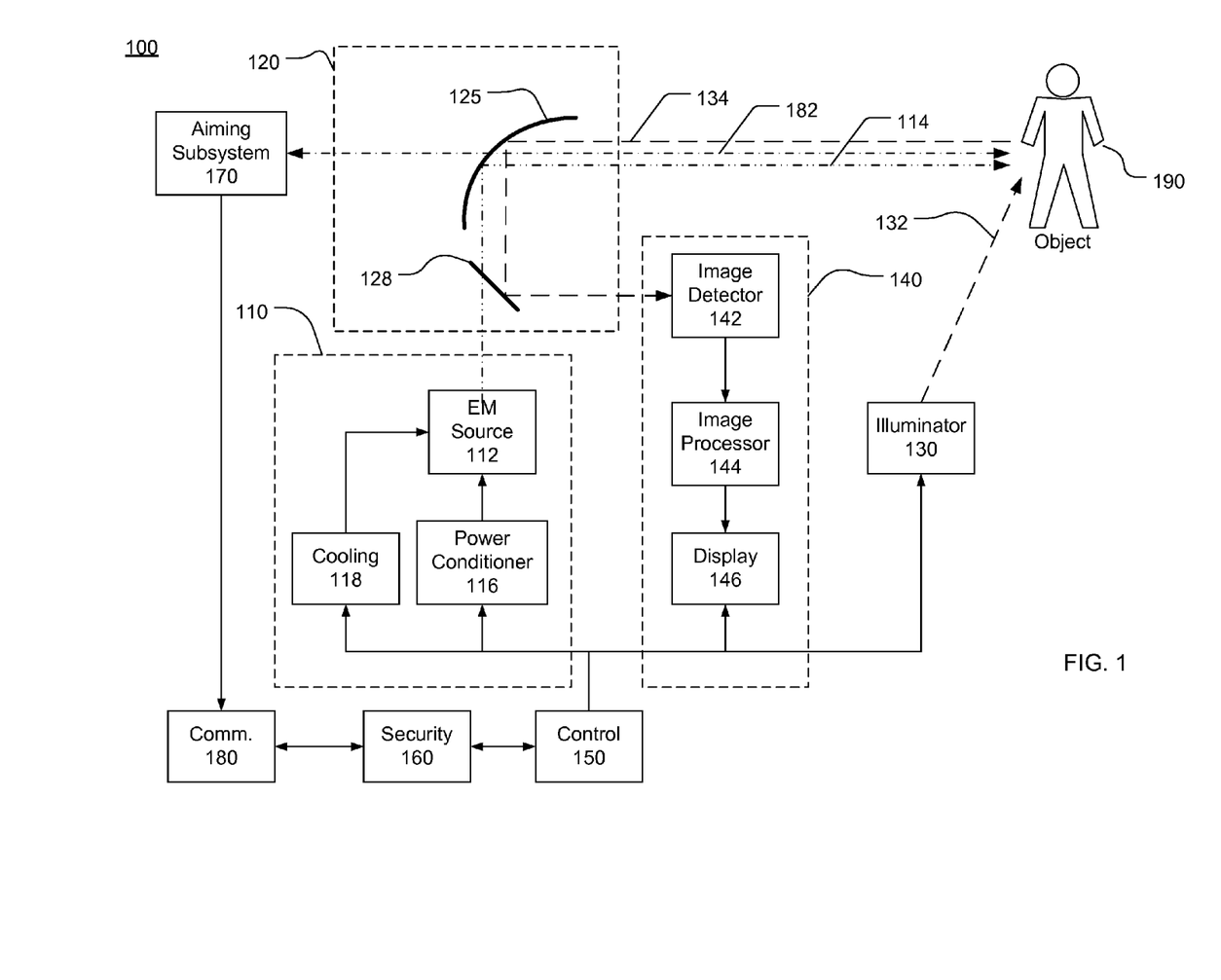
FIG. 1 is a block diagram of a dual use directed energy weapon and imager.

Referring now to FIG. 1, a dual use directed energy weapon and imager 100 may include a generator 110 for generating a first beam of electromagnetic energy 114, a beam director 120 for directing the first beam of electromagnetic energy 114 to an object 190, and an imager 140 to capture an image of the object 190. The dual use directed energy weapon and imager 100 may optionally include an illuminator 130 for illuminating the object 190 with a second beam of electromagnetic energy 132. The imager 140 may capture the image of the object 190 using at least a portion of the second beam of electromagnetic energy 132 that is reflected from the object 190 as image beam 134. The generator 110 may include an electromagnetic energy source 112 which may be supported by a power conditioner 116 and a cooling subsystem 118. The electromagnetic energy source 112 may be a solid-state source, a vacuum tube source, or another source. The electromagnetic energy source 112 may include an array of solid state sources, such as a planar reflect-array, a grid oscillator array, a grid amplifier array, or another form of amplifier array. The outputs of the array of solid state sources may be spatially combined, or combined using a conventional waveguide power combiner, stripline power combiner, or another power combining technique. The electromagnetic energy source 112 may generate W-band millimeter wave (MMW) electromagnetic energy, which may have a frequency of 75 to 110 GHz. The electromagnetic energy source 112 may generate microwave energy, terahertz energy, or other electromagnetic energy.

The power conditioner 116 may convert power from a primary power source to one or more power forms required by the electromagnetic energy source 112. The primary power source may be a battery, a vehicle generator or other generator, or a conventional 120-volt or other AC power supply.

The cooling subsystem 118 may remove heat generated by the electromagnetic energy source 112 and power conditioner 116. The cooling subsystem may incorporate a coolant which may be air or another gas, a liquid, or a phase change material. The cooling system may use cryogenic gas from a gas bottle as a coolant. The cooling system may include one or more heat exchangers to transfer heat from the electromagnetic energy source 112 to the coolant, and/or from the coolant to the surrounding air or to another medium.

The beam director 120 may include at least one optical element 125 which may define an aperture through which the first beam of electromagnetic energy 114 must pass. While the optical element 125 is shown schematically in FIG. 1 as a curved mirror, the beam director 120 may include multiple optical elements which may include spherical, parabolic, aspheric or other curved mirrors, flat mirrors, spherical and aspheric lenses, and passive reflect-arrays which, although physically flat, function similar to a curved mirror.

The beam director 120 may also include an aperture-sharing element 128 to separate the image beam 134 used for imaging from the first beam of electromagnetic energy 114. Many configurations of an aperture-sharing element are known. In the example of FIG. 1, the aperture-sharing element 128 transmits the first beam of electromagnetic energy 114 but reflects the image beam 134 from the object 190. To allow separation at the aperture-sharing element 128, the first beam of electromagnetic energy 114 and the image beam 134 may differ in frequency, polarization state, or both frequency and polarization.

The illuminator 130 may be a continuous-wave (CW) or modulated source of millimeter wave or other electromagnetic energy. As will be discussed, the imager 140 may capture an image of the object 190 using a portion of the energy from the illuminator 130 which is reflected from the object 190. The illuminator 130 and the imager 140 do not constitute a Radar sensor, since no attempt is made to determine the range to the object or to otherwise form a three-dimensional image. In order to allow the reflected beam 134 to be separated from the first beam of electromagnetic energy 114 at the aperture-sharing element 128, the illuminator 130 may generate an illumination beam 132 that has a different frequency, or a different polarization, or both, from the first beam of electromagnetic energy 114.

The imager 140 for capturing an image of object 190 may include an image detector array 142 that receives the image beam 134 from the aperture-sharing element 128. Within this document, the phrase "capture an image" is intended to mean optically forming an image at a focal plane and detecting the image with an array of detectors to form an electronic image signal representative of the image. The captured image may be displayed and/or recorded. Within this document, an "imager" is an opto-electronic system that captures the image of an object. The image detector array 142 may be an array of energy detectors such as an array of antennas feeding a corresponding number of bolometers, or an array of antennas coupled to detector diodes. The image detector array 142 may include low noise amplifiers for each detector element. The image detector array 142 may be any array of detectors suitable for detecting the illumination energy provided by the illuminator 130.

The imager 140 may include an image processor 144 that converts image signals from the image detector array 142 into a form suitable for presentation on display 146. The image processor 144 may include a wide range of signal processing and image processing functions such as amplification, thresholding, gamma correction or other nonlinear level transformation, resolution enhancement, and jitter reduction. As will be discussed subsequently, the dual use directed energy weapon and imager 100 may include an aiming subsystem 170 that may include a video camera or other instrument that forms another image of object 190. The image processor 144 may receive one or more additional image signals (not shown in FIG. 1) from the aiming subsystem 170, and may combine the received image signals with the image from image detector array 142 for presentation on display 146. The image processor 144 may use known techniques, such as pseudo-coloration, to combine multiple images.

The display 146 may be any display device, such as a CRT display, liquid crystal display, or light-emitting diode display having sufficient resolution to present the image or images of the object 190. The display device may be opaque, or may be transparent and disposed in or near an operator's line of sight to the object 190. The display device may be a head-up display that superimposes the displayed image over the object, at the same apparent distance as the object, such that an operator may view the object and the displayed image simultaneously without any change in angle of view or eye focus. The optics required to superimpose the displayed information over the object are not shown in FIG. 1 but are well known in the display art.

The dual use directed energy weapon and imager 100 may also include a control subsystem 150. The control subsystem 150 may include one or more ergonomically sensible controls to activate the illuminator 130 and the imager 140, as well as a trigger or other control means to activate the generator 110 to generate the first beam of electromagnetic energy. The control subsystem 150 may include other manual or autonomous functions such as adjusting the appearance of the display 146, limiting the duration that the first beam of electromagnetic energy can be directed towards an object, sensing hazardous conditions such as excessive temperature in the source of electromagnetic energy 112, and informing the operator when the primary power source or coolant supply may be depleted.

The control subsystem 150 may interact with a security subsystem 160 to prevent unauthorized or inappropriate use of the dual use directed energy weapon and imager 100 and to safeguard against the use of this weapon by unauthorized persons who acquire stolen or captured weapons. The security subsystem 160 may include a simple keypad for entry of a personal identification number to authenticate a user, or a fingerprint reader or other biometric identification means such as is being used for keyless entry into automobiles. The security subsystem 160 may include less evident protection measures, such as a special protocol for replacing batteries. The security subsystem 160 may also include a "self destruct" mechanism to damage or destroy critical portions of the dual use directed energy weapon and imager 100, such as the electromagnetic energy source 112, in the event of an attempt at unauthorized use or unauthorized disassembly.

The dual use directed energy weapon and imager 100 may also include an aiming subsystem 170. The aiming subsystem 170 may include a low-magnification or unity-magnification optical telescope or a laser or other optical source to provide a visible pointing beam aligned with the direction of the first electromagnetic beam 114. The aiming subsystem 170 may include a video camera, infrared camera, or other aiming sensor aligned with the direction of the first electromagnetic beam 114. The image from such an aiming sensor may be displayed to allow operation of the dual use directed energy weapon and imager 100 by an operator who does not have a direct view of the object 190. The image from an aiming sensor may also be recorded for purposes of operator training, verification of appropriate use within defined rules of engagement, and post-use analysis of tactics and command decisions. The aiming subsystem 170 may incorporate, possibly as a backup aiming means, mechanical alignment targets such as the traditional front and rear sights on a rifle.

The dual use directed energy weapon and imager 100 may also include a communication subsystem 180. The communication subsystem 180 may use a two-way wired, wireless, or optical link to communicate image and control information to a remote or detached location. The communication subsystem 180 may be used in conjunction with the aiming, security, and control subsystems (170, 160, 150, respectively) to allow remote operation of the dual use directed energy weapon and imager 100, or remote authorization for its use. The communication subsystem 180 may transmit image data from the imager 140 and the aiming subsystem 170 to a remote location for monitoring, recording, or analysis.

Figure 2:
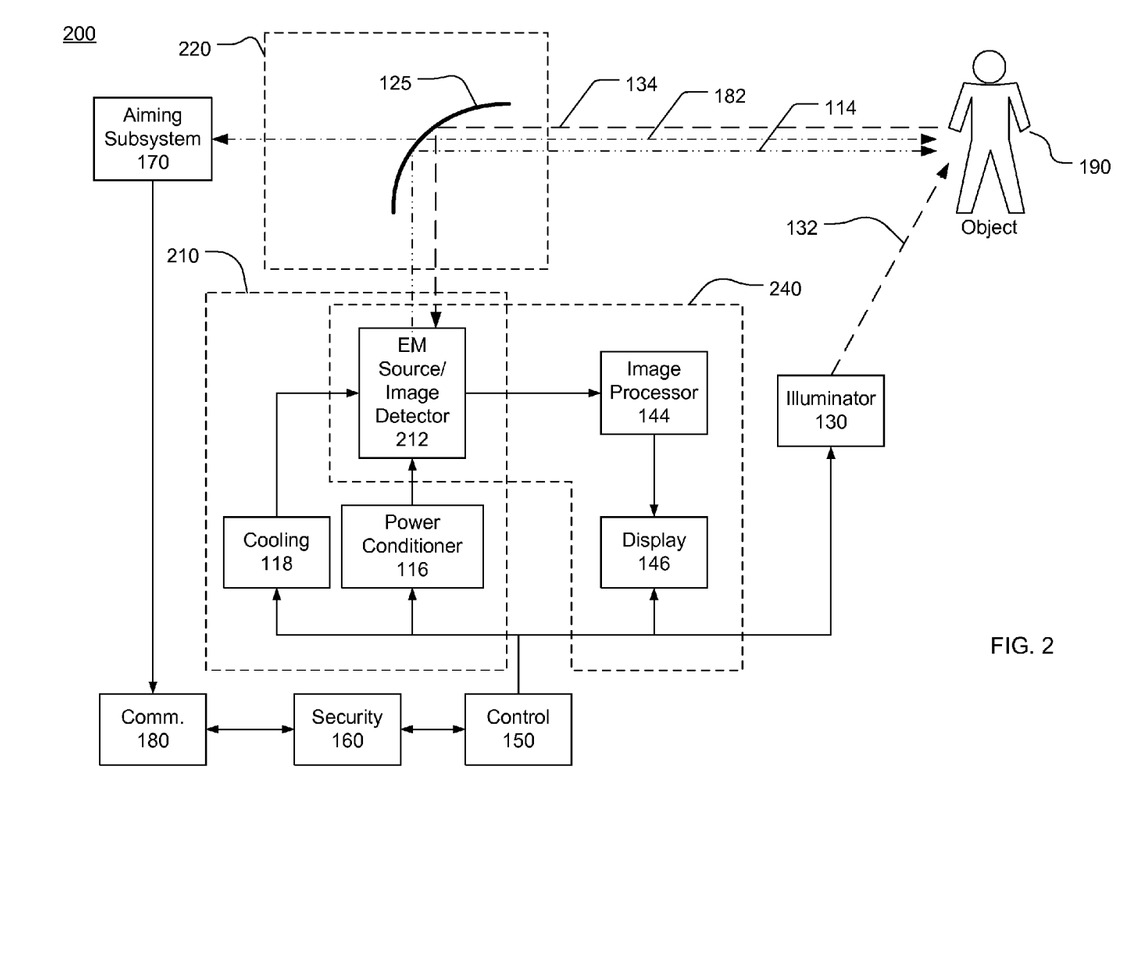
FIG. 2 is a block diagram of a dual use directed energy weapon and imager.

Referring now to FIG. 2, another dual use directed energy weapon and imager 200 may include a generator 210 for generating a first beam of electromagnetic energy 114, a beam director 220 for directing the first beam of electromagnetic energy 114 to an object 190, an illuminator 130 for illuminating the object 190 with a second beam of electromagnetic energy 132, and an imager 240 for forming an image of the object 190 using at least a portion of the second beam of electromagnetic energy 132 that is reflected from the object 190 as image beam 134. Elements of FIG. 2 having a reference designator between 110 and 190 have the same function as described in conjunction with FIG. 1, and the description of such elements will not be repeated. The dual use directed energy weapon and imager 200 may include an integrated electromagnetic energy source and image detector 212 which constitutes part of both the generator 210 and the imager 240. The integrated electromagnetic energy source and image detector 212 may include an array of transmit/receive modules, each of which that function both as a source of electromagnetic energy and as a detector. The integrated electromagnetic energy source and image detector 212 may include an array of electromagnetic energy sources interleaved with a second array of detectors. The array of detectors may be adapted to detect electromagnetic energy of a different polarization or a different wavelength from the electromagnetic energy provided by the array of sources.

Since the integrated electromagnetic energy source and image detector 212 may include both the source of the first beam of electromagnetic energy 114 and the image detectors, the beam director 220 need not include an aperture-sharing element such as element 128 in FIG. 1.

Figure 3A:
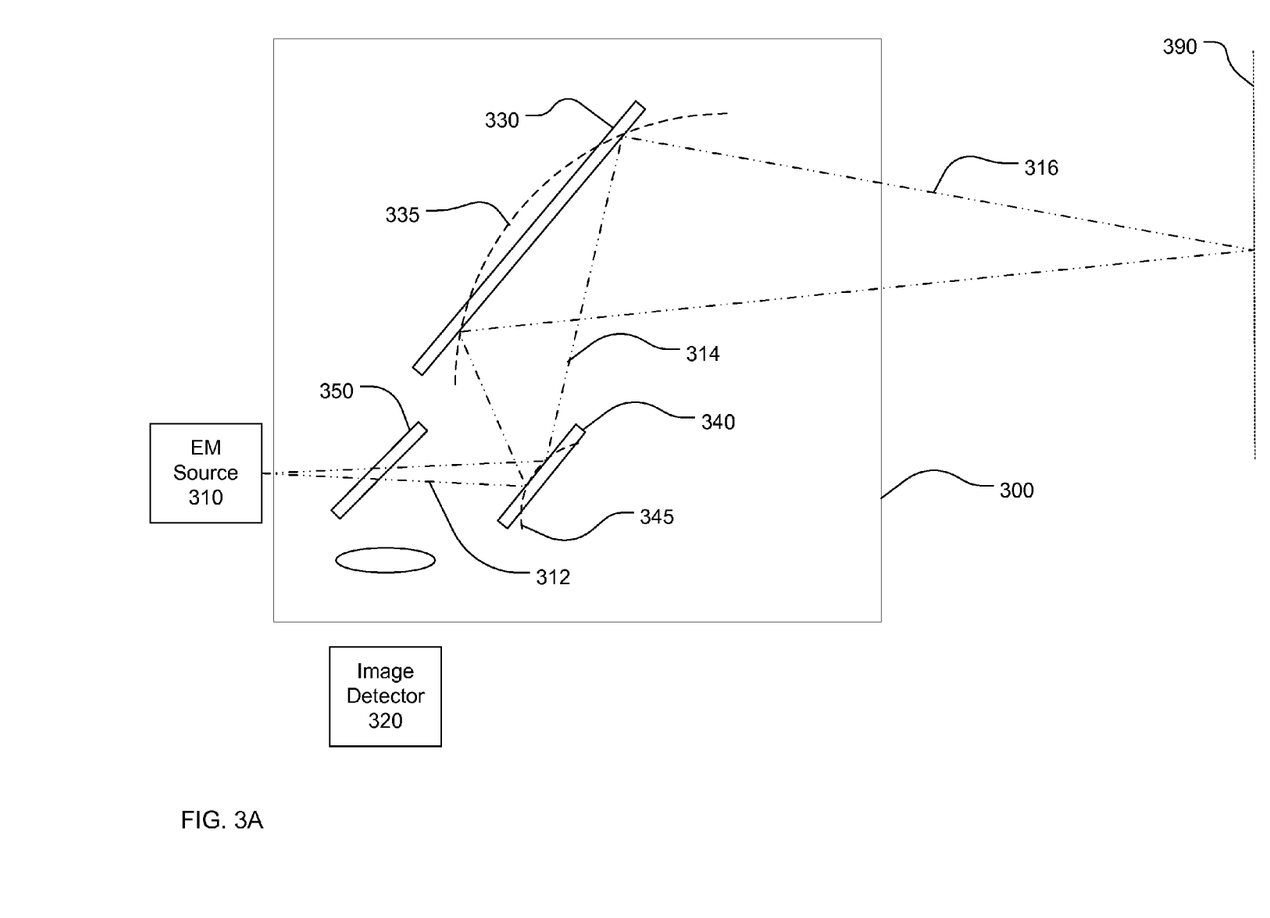
FIG. 3A and FIG. 3B are schematic diagrams of an optical system.

FIG. 3A is a schematic diagram of an exemplary optical system 300 that may be suitable for the beam director 120 in FIG. 1. The optical system 300 may include a secondary reflective element 340 and a primary reflective element 330.

The terms "primary" and "secondary" are consistent with common terminology for optical telescopes. The secondary reflective element 340 may be a passive reflect-array which, although physically flat, may have a negative optical power as indicated by the dashed curved surface 345. The passive reflect-array may have a pattern of discrete re-radiating elements, each of which receives and re-transmits a respective portion of the incident wavefront with an appropriate phase change such that, electrically, the passive reflect-array mimics the optical behavior of a curved reflector. An example of a passive reflect-array is the FLAPS antenna technology developed by Malibu Research, Inc.

The electromagnetic energy source 310 may generate a directed energy beam of electromagnetic energy 312 which passes through an aperture-sharing element 350 to the secondary reflective element 340. The secondary reflective element 340 may reflect a diverging directed energy beam 314 toward the primary reflective element 330. The primary reflective element 330 may also be a passive reflect-array which, although physically flat, may have positive optical power as indicated by the dashed curved line 335. The primary reflective element 330 may accept the diverging directed energy beam 314 from the secondary reflective element 340 and may form a converging directed energy beam 316 that may be focused to a spot at an object plane 390.

The physical extent of the primary reflective element 330 may define an aperture that limits the resolution of the optical system 300. The resolution of the optical system can be approximated by the simple relationship:

$$W = \frac{R\lambda}{D},$$

where W is the spatial resolution, R is the range, $\lambda$ is the wavelength, and D is the effective diameter of the aperture. To focus the converging directed energy beam 316 to a relatively small spot at the object plane 390, the aperture diameter must be very large with respect to the waveguide of the directed energy beam 316. For example, assuming a range of 15 meters, a frequency of 95 GHz with a wavelength of 3.16 millimeters, and an effective aperture diameter of 18 inches, the optical system will have a resolution W at the object plane of 10.4 centimeters or about 4 inches.

A primary reflective element diameter of 18 inches may be suitable for a man-portable dual use directed energy weapon and imager. Tripod-mounted, vehicle-mounted, and semi-stationary dual use directed energy weapon and imager systems may include a larger primary reflective element, resulting in proportionally improved resolution (smaller spot size at the object plane).

Forming an image of an object or individual using millimeter wave or sub-millimeter (terahertz) wave radiation is known to be an effective technique for detecting and locating concealed objects such as weapons and explosives. The millimeter or sub-millimeter radiation penetrates clothing and scatters and reflects from underlying objects. The scattered and reflected radiation can be formed into an image at a focal plane by a suitable optical system and the image can be detected by an array of detectors disposed at the focal plane. The resolution of an optical system when forming an image can be approximated by the previously stated equation. Thus a millimeter wave or sub-millimeter wave imager also requires an aperture that is very large compared to the wavelength used to form the image.

The optical system 300 allows a single aperture, and at least one optical element, to be shared by the optical systems for both the directed energy beam from the electromagnetic energy source 310 and for an imaging system. An optical element is considered "shared" if the optical element forms a portion of two optical systems, and an aperture is considered "shared" if the beams for two optical system pass through it. In the example optical system 300, the primary reflective element 330, the aperture defined by the primary reflective element 330, and the secondary reflective element 340 may be shared between a directed energy optical system and an imaging optical system.

Figure 3B:
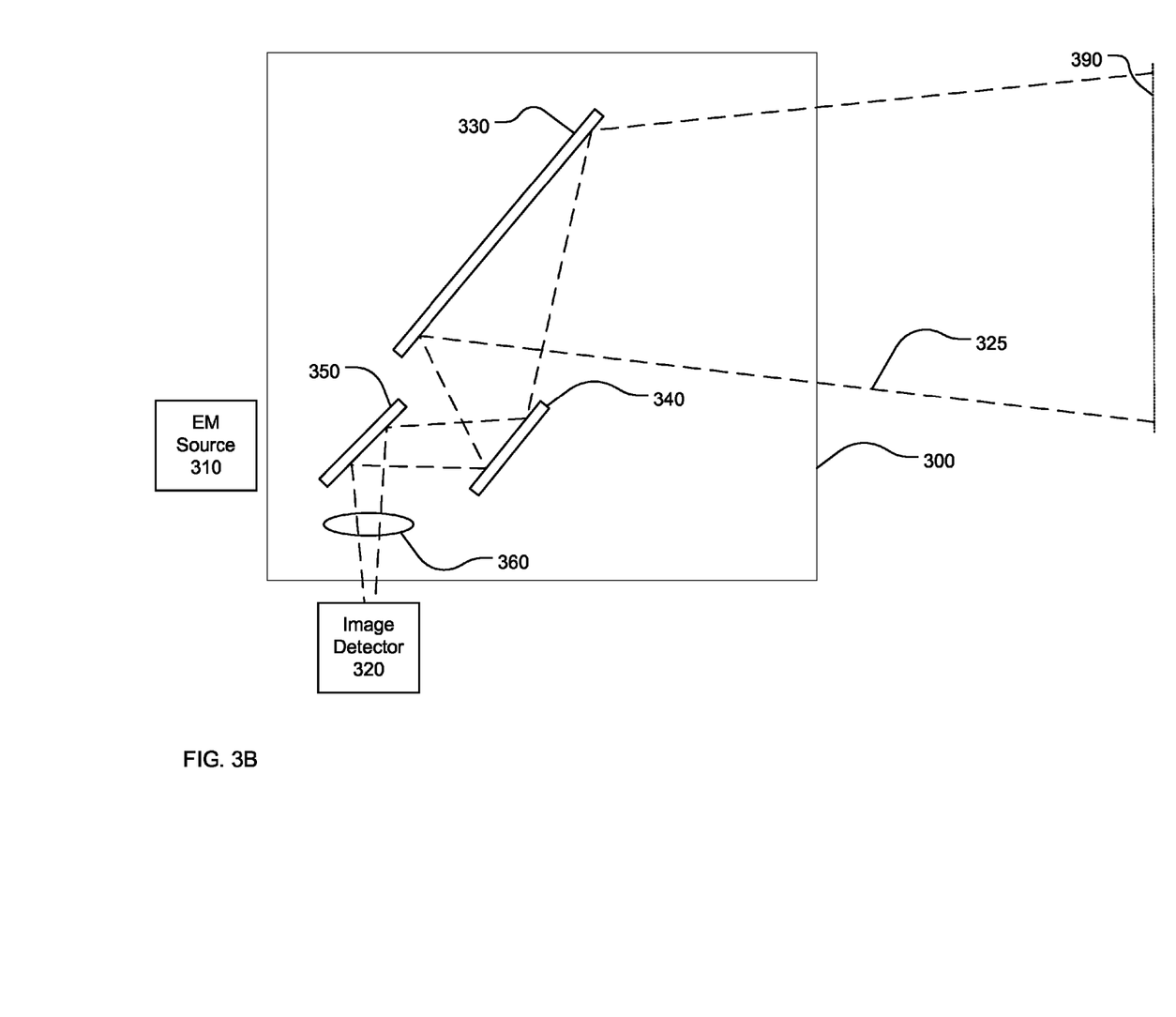

FIG. 3B shows the imaging beam path through the optical system 300, which was previously shown in FIG. 3A. The imaging beam 325 originates at the object plane 390, where light from an illumination source (not shown) reflects from an object (not shown). An image of the object plane 390 is formed at the focal plane of image detector 320 by the combined optical power of the primary reflective element 330, the secondary reflective element 340, the aperture-sharing element 350, and, optionally, additional optical elements represented schematically by lens 360.

As shown in FIG. 3A, the optical system 300 may be configured to focus the directed energy beam 316 to a relatively small spot at the object plane 390. Conversely, as shown in FIG. 3B, the optical system 300 may be configured to form an image of a larger region of object plane 390 at the image detector 320. Thus the optical system 300 may have a larger magnification factor for the imaging beam 325 than for the directed energy beam 316. A number of techniques are available to provide different magnification factors for the imaging beam 325 and the directed energy beam 316. Additional optical elements, represented schematically by lens 360, may be disposed in the imaging portion of the optical system. Additionally, the optical power or focal length of the primary reflective element 330 and/or the secondary reflective element 340 may be different for the imaging and directed energy beams. The beam sharing element 350 may have optical power for the beam reflected by the beam sharing element. Combinations of these and other techniques may be used.

The imaging beam 325 travels, for the most part, through the same space as the directed energy beam (312, 314, 316 in FIG. 3A). The imaging beam 325 is separated from the directed energy beam by the action of the aperture-sharing element 350 which, in this example, reflects the imaging beam 325 while transmitting the directed energy beam 312. In other optical systems, the aperture-sharing element 350 may reflect the directed energy beam and transmit the imaging beam. The aperture-sharing element 350 may distinguish the directed energy beam 312 and the imaging beam 325 based on polarization, frequency, or some other characteristic.

The directed energy beam 312 may have a first polarization state that is transmitted through the aperture-sharing element 350. The imaging beam 325, and the associated illumination source, may have a second polarization state different from the first polarization state. The second polarization state may be reflected from the aperture-sharing element 350. To provide different magnification for the imaging beam 325 and the directed energy beam 312, the primary reflective element 330 and, optionally, the secondary reflective element 340, may have different optical power for the first polarization state and the second polarization state.

Similarly, the directed energy beam 312 may have a first frequency that is transmitted through the aperture-sharing element 350. The imaging beam 325, and the associated illumination source, may have a second frequency different from the first frequency. The second frequency may be reflected from the aperture-sharing element 350. To provide different magnification for the imaging beam 325 and the directed energy beam 312, the primary reflective element 330 and, optionally, the secondary reflective element 340, may have different optical power for the first frequency and the second frequency. To provide improved imaging resolution, the imaging beam 325 may have a frequency that is higher than the frequency of the directed energy beam 312. The imaging beam 325 may have a frequency that is between 1.5 and 10 times the frequency of the directed energy beam 312.

Figure 4:
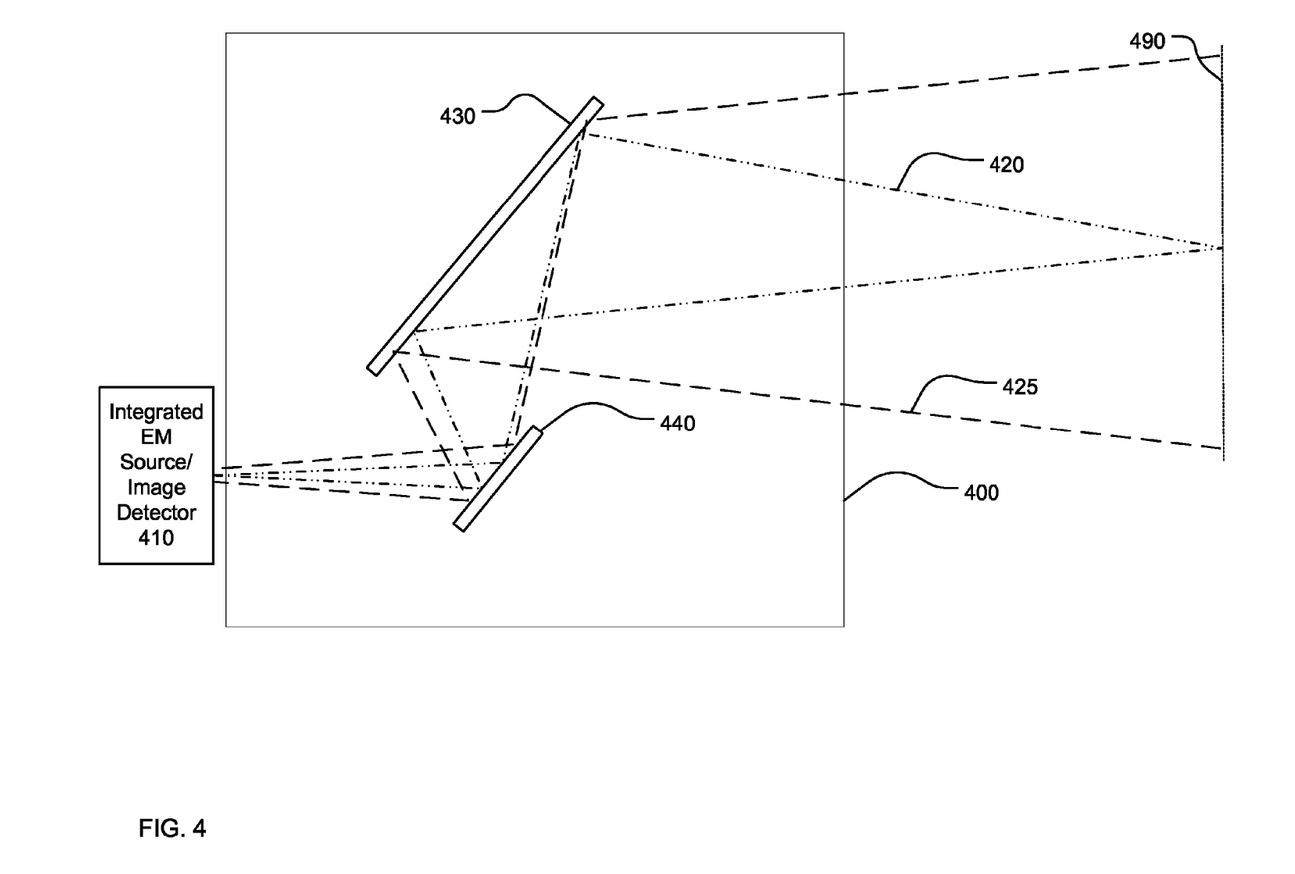
FIG. 4 is a schematic diagram of an optical system.

FIG. 4 is a schematic diagram of an exemplary optical system 400 that may be suitable for the beam director 220 in FIG. 2. The optical system 400 may include a secondary reflective element 440 and a primary reflective element 430. One or both of the primary reflective element 430 and the secondary reflective element 440 may be a passive reflectarray which, although physically flat, may have an optical power.

The integrated electromagnetic energy source/image detector 410 may generate a directed energy beam 420 of electromagnetic energy. The secondary reflective element 440 may reflect the directed energy beam as a diverging beam toward the primary reflective element 430. The primary reflective element 430 may accept the diverging beam from the secondary reflective element 340 and may form a converging directed energy beam 420 that may be focused to a spot at an object plane 490.

The optical system 400 may form an image of a portion of the object plane 490 at a detector array within the integrated electromagnetic energy source/image detector 410. The optical system 400 may be adapted to provide a higher magnification factor for the imaging beam 425 than for the directed energy beam 420.

The directed energy beam 420 may have a first polarization state. The imaging beam 425, and the associated illumination source, may have a second polarization state different from the first polarization state. To provide different magnification for the imaging beam 425 and the directed energy beam 420, the primary reflective element 430 and, optionally, the secondary reflective element 440, may have different optical power for the first polarization state and the second polarization state.

Similarly, the directed energy beam 420 may have a first frequency. The imaging beam 425, and the associated illumination source, may have a second frequency different from the first frequency. To provide different magnification for the imaging beam 425 and the directed energy beam 420, the primary reflective element 430 and, optionally, the secondary reflective element 440, may have different optical power for the first frequency and the second frequency. The optical system 400 is not limited to two reflective optical elements, and one or more additional elements may be added.

Figure 5:
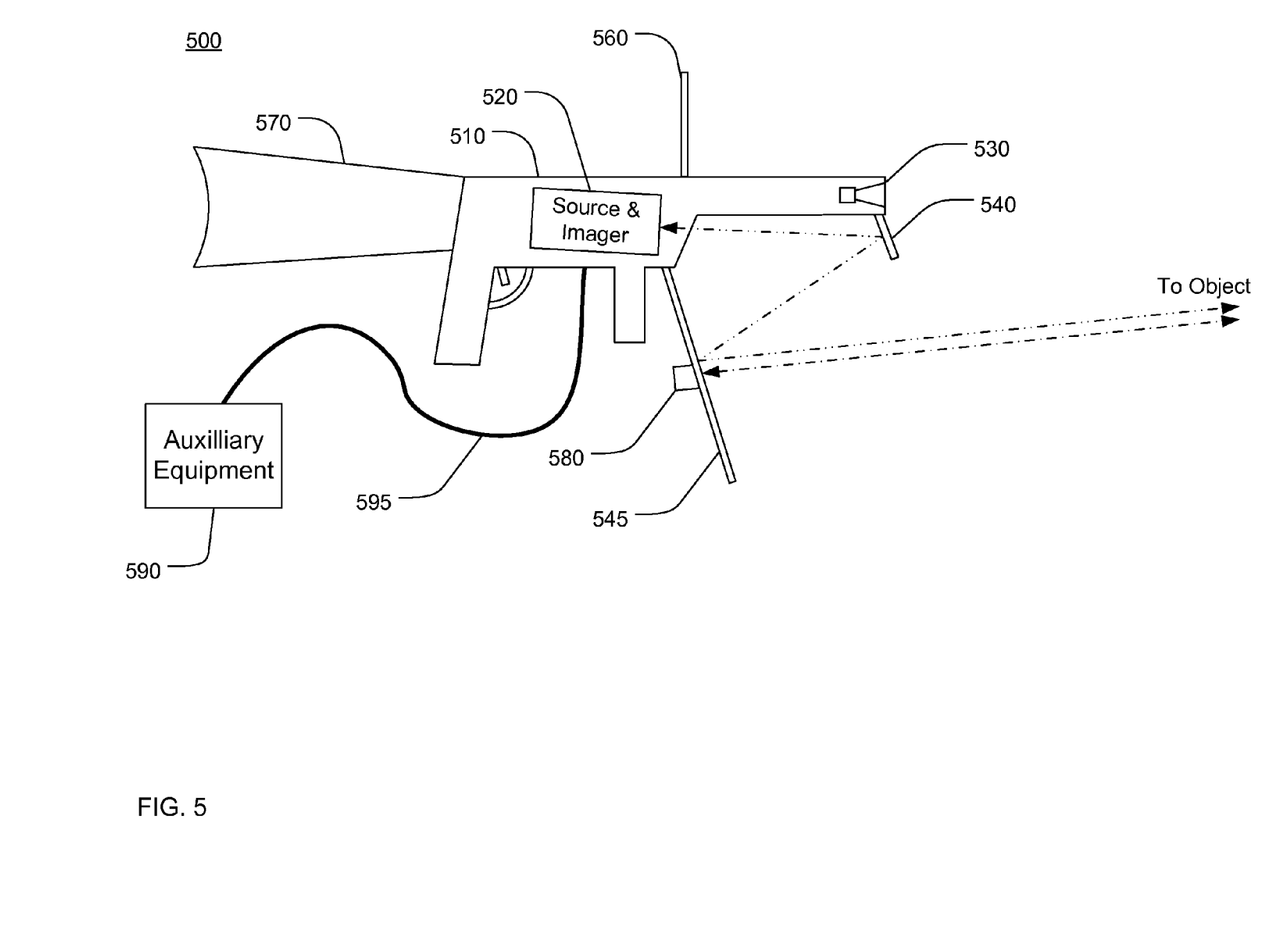
FIG. 5 is a conceptual elevational view of a hand-held dual use directed energy weapon and imager.

FIG. 5 is an example of a man-portable dual use directed energy weapon and imager 500, which may be the dual use directed energy weapon and imager 100 or 200 of FIG. 1 and FIG. 2, respectively. The dual use directed energy weapon and imager 500 may include a housing 510 that is generally modeled after the shape of a rifle or other weapon. The housing 510 may be shaped like a known weapon for psychological impact and because existing weapons are ergonomically designed to be accurately and comfortably pointed by their operator. The housing 510 may include a stock 570 for placement against the operator's shoulder. The housing 510 may have some shape that does not resembled a rifle or other conventional weapon.

The housing 510 may encompass a source of electromagnetic energy and an imager, shown generally at 520. The housing 510 may support a first reflective element 545 and a second reflective element 540, which may be similar to the primary and secondary reflective elements 340, 330 of FIG. 3A and FIG. 3B. The housing 510 may encompass an illumination source 530, which may be disposed on or within the housing at any location that allows illumination of the object to be imaged by the imager. An aiming subsystem 580 may be mounted on the first reflective element 545, as shown, or may be disposed at other locations on or with the housing 510. The aiming subsystem 580 may include a laser or other optical source to generate a pointing beam, and may include a video or other camera.

The housing 510 may be connected to an auxiliary equipment container 590 by means of an umbilical cable 595. The auxiliary equipment container 590 may take the form of a backpack, hip belt, or other form for a man portable system. The auxiliary equipment container 590 may encompass all or portions of the batteries or other primary power supply and all or portions of the cooling, power conditioning, security, and communications subsystems, if included in the dual purpose directed energy weapon and imager 500. The umbilical cable 595 may contain electrical wiring and/or flexible tubing for conducting electrical power, signals, and gaseous or liquid coolant between the auxiliary equipment container 590 and the housing 510.

Figure 6:
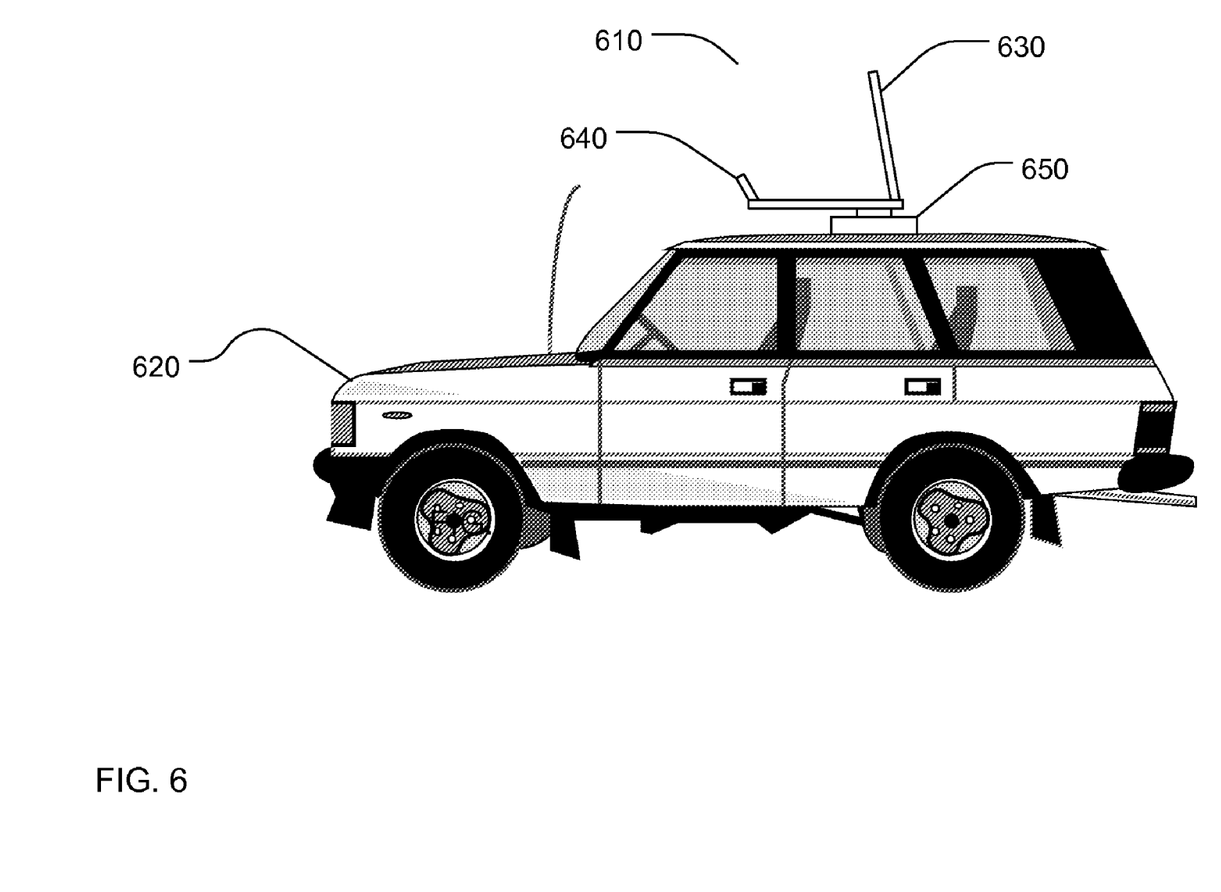
FIG. 6 is a conceptual elevational view of a vehicle-mounted dual use directed energy weapon and imager.

FIG. 6 is an example of a dual use directed energy weapon and imager 610 mounted on a vehicle 620. The dual use directed energy weapon and imager 610 may be the dual use directed energy weapon and imager 100 or 200 of FIG. 1 and FIG. 2, respectively. The dual use directed energy weapon and imager 610 may include a beam director system, including a first reflective element 630 and a second reflective element 640, that may be at least partially disposed external to the vehicle. The balance of the dual use directed energy weapon and imager 610 may be disposed within the passenger compartment, trunk, or other interior or exterior portion of the vehicle. The vehicle 620 is representative, and the dual use directed energy weapon and imager 610 may be mounted on an automobile, truck, van, multi-purpose vehicle, or any other suitable vehicle.

The vehicle-mounted dual use directed energy weapon and imager 610 may include a single-axis or multi-axis gimbal 650 that allows pointing a directed energy beam formed by the beam director system in different directions in azimuth and, optionally, elevation. The vehicle-mounted dual use directed energy weapon and imager 610 may include a control subsystem (not shown in FIG. 6) that drive the gimbal 650 to track an object. The control subsystem may use image information from an imager (140 in FIG. 1) or an aiming subsystem (170 in FIG. 1) to track the object.

The man-portable dual use directed energy weapon and imager 500 of FIG. 5 and the vehicle-mounted dual use directed energy weapon and imager 610 of FIG. 6 are examples only, and other dual use directed energy weapon and imager systems may be adapted for mounting on a tripod, a stationary structure, a ship, or an air vehicle. Such other systems may be fully contained within a single housing, or may include an umbilical and an auxiliary equipment housing, and may contain additional elements and features.

Closing Comments

The foregoing is merely illustrative and not limiting, having been presented by way of example only. Although examples have been shown and described, it will be apparent to those having ordinary skill in the art that changes, modifications, and/or alterations may be made.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

For means-plus-function limitations recited in the claims, the means are not intended to be limited to the means disclosed herein for performing the recited function, but are intended to cover in scope any means, known now or later developed, for performing the recited function.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of" respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

The invention claimed is:

1. A dual use directed energy weapon and imager, comprising:
   first means for providing a first beam of electromagnetic energy;
   second means for directing the first beam of electromagnetic energy to an object, the second means defining an aperture; and
   a third means for capturing an image of the object wherein the third means shares the aperture defined by the second means.

2. The dual use directed energy weapon and imager of claim 1, wherein the first beam of electromagnetic energy is a beam of millimeter wave electromagnetic energy.

3. The dual use directed energy weapon and imager of claim 2, wherein the first beam of electromagnetic energy has a frequency of 75 GHz to 110 GHz.

4. The dual use directed energy weapon and imager of claim 1, wherein the second means comprises a primary reflective element, the primary reflective element defining the aperture.

5. The dual use directed energy weapon of claim 1, further comprising fourth means to illuminate the object with a second beam of electromagnetic energy
   wherein the third means captures an image of the object using at least a portion of the second beam reflected from the object.

6. The dual use directed energy weapon and imager of claim 5, wherein the first beam of electromagnetic energy has a first polarization state and the second beam of electromagnetic energy has a second polarization state different from the first polarization state.

7. The dual use directed energy weapon and imager of claim 6, wherein the second means further comprises an aperture-sharing element that separates the first beam of electromagnetic energy and the reflected portion of the second beam of electromagnetic energy based on polarization state.

8. The dual use directed energy weapon and imager of claim 6, wherein the primary reflective element has different optical power for the first polarization state and the second polarization state.

9. The dual use directed energy weapon and imager of claim 5, wherein the first beam of electromagnetic energy has a first frequency and the second beam of electromagnetic energy has a second frequency different from the first frequency.

10. The dual use directed energy weapon and imager of claim 9, wherein the second means further comprises an aperture-sharing element that separates the first beam of electromagnetic energy and the reflected portion of the second beam of electromagnetic energy based on frequency.

11. The dual use directed energy weapon and imager of claim 9, wherein the primary reflective element has different optical power for the first frequency and the second frequency.

12. The dual use directed energy weapon and imager of claim 9, wherein the second frequency is between 1.5 times and 10 times the first frequency.

13. The dual use directed energy weapon and imager of claim 1, further comprising a control subsystem.

14. The dual use directed energy weapon and imager of claim 1, further comprising a security subsystem.

15. The dual use directed energy weapon and imager of claim 1, further comprising an aiming subsystem.

16. The dual use directed energy weapon and imager of claim 1, further comprising a communications subsystem.

17. A dual use directed energy weapon and imager, comprising:
    a generator providing a first beam of millimeter wave electromagnetic energy;
    a beam director to direct the first beam of millimeter wave electromagnetic energy from the source to an object, the beam director defining an aperture; and
    an imager to capture an image of the object wherein the imager shares the aperture defined by the beam director.

18. The dual use directed energy weapon and imager of claim 17, wherein the first beam of millimeter wave electromagnetic energy has a frequency of 75 GHz to 110 GHz.

19. The dual use directed energy weapon and imager of claim 17, wherein the beam director comprises a primary reflective element, the primary reflective element defining the aperture.

20. The dual use directed energy weapon of claim 17, further comprising an illuminator to illuminate the object with a second beam of electromagnetic energy
    wherein the imager captures an image of the object using at least a portion of the second beam reflected from the object.

21. The dual use directed energy weapon and imager of claim 20, wherein the first beam of millimeter wave electromagnetic energy has a first polarization state and the second beam of electromagnetic energy has a second polarization state different from the first polarization state.

22. The dual use directed energy weapon and imager of claim 21, wherein the beam director comprises an aperture-sharing element that separates the first beam of millimeter wave electromagnetic energy and the reflected portion of the second beam of electromagnetic energy based on polarization state.

23. The dual use directed energy weapon and imager of claim 21, wherein the primary reflective element has different optical power for the first polarization state and the second polarization state.

24. The dual use directed energy weapon and imager of claim 20, wherein the first beam of millimeter wave electromagnetic energy has a first frequency and the second beam of electromagnetic energy has a second frequency different from the first frequency.

25. The dual use directed energy weapon and imager of claim 24, wherein the beam director comprises an aperture-sharing element that separates the first beam of millimeter wave electromagnetic energy and the reflected portion of the second beam of electromagnetic energy based on frequency.

26. The dual use directed energy weapon and imager of claim 24, wherein the primary reflective element has different optical power for the first frequency and the second frequency.

27. The dual use directed energy weapon and imager of claim 24, wherein the second beam of electromagnetic energy has a frequency that is 1.5 to 10 times the frequency of the first beam of electromagnetic energy.

28. The dual use directed energy weapon and imager of claim 17, further comprising a control subsystem.

29. The dual use directed energy weapon and imager of claim 17, further comprising a security subsystem.

30. The dual use directed energy weapon and imager of claim 17, further comprising an aiming subsystem.

31. The dual use directed energy weapon and imager of claim 17, further comprising a communications subsystem.

* * * * *